(No Model.)

J. RUSH.
COMBINED ROLLER, CULTIVATOR, AND SEEDER.

No. 435,249. Patented Aug. 26, 1890.

WITNESSES:
P. L. Brooks.
Arthur E. Powell.

INVENTOR
John Rush
BY
T. A. Alexander
his ATTORNEY.

UNITED STATES PATENT OFFICE.

JOHN RUSH, OF SOUTH BEND, INDIANA.

COMBINED ROLLER, CULTIVATOR, AND SEEDER.

SPECIFICATION forming part of Letters Patent No. 435,249, dated August 26, 1890.

Application filed December 13, 1889. Serial No. 333,625. (No model.)

*To all whom it may concern:*

Be it known that I, JOHN RUSH, of South Bend, in the county of St. Joseph and State of Indiana, have invented certain new and useful Improvements in a Combined Roller, Cultivator, and Seeder; and I do hereby declare that the following is a full, clear, and exact description thereof, reference being had to the accompanying drawings, and to the letters of reference marked thereon, which form part of this specification, in which—

Figure 1:
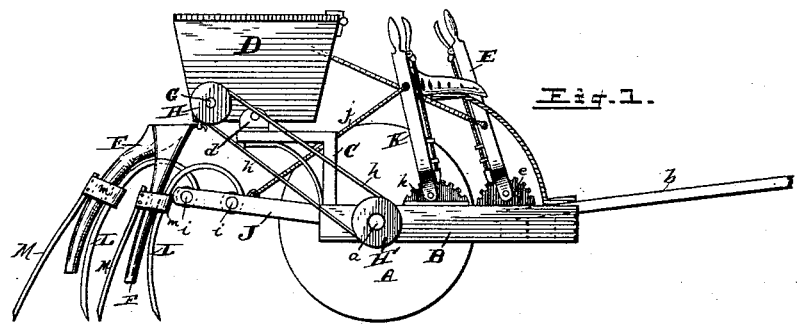
Figure 2:
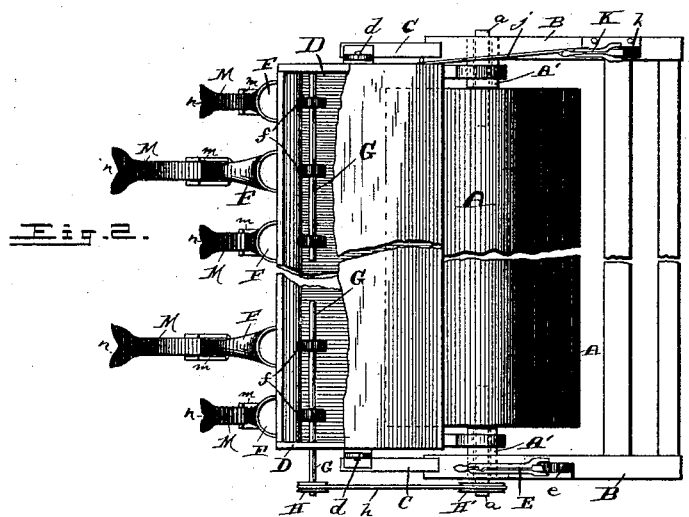
Figure 4:
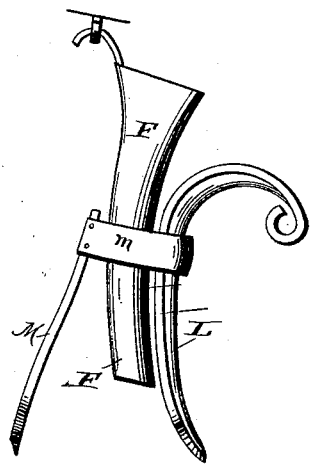
Figure 3:
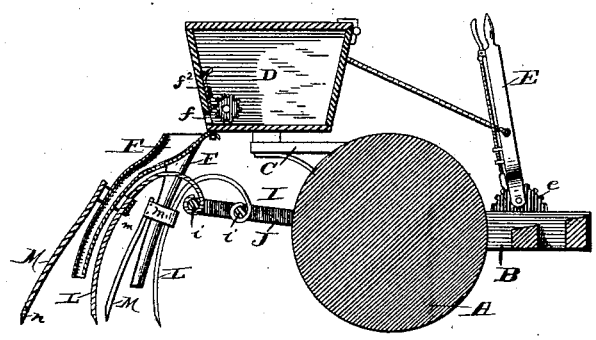

Figure 1 is a side elevation of my improved combined seeder, roller, and harrow. Fig. 2 is a top plan view thereof. Fig. 3 is a transverse vertical sectional view. Fig. 4 is a detail view.

This invention is an improvement in farming implements, and it is a combined seeder, roller, and cultivator by which the ground can be rolled or crushed, furrows opened, seed dropped, and furrows closed and harrowed at the same time by one machine embodying the necessary mechanisms for effecting these objects; and it consists in the novel combination and arrangement of parts hereinafter described and claimed.

Referring to the drawings by letters, A designates a roller or crushing-cylinder, having a central shaft or stub-shafts $a$ $a$ at its ends, which are journaled in boxings A', secured in the end pieces of a rectangular frame B, as shown, which frame is at the front provided with a draft-tongue $b$ or other suitable devices for attaching draft-animals, as usual.

C C are bracket-pieces secured to the rear edges of frame B beside the ends of the roller and projecting above and in rear of the same, and D designates a seed-box lying behind but parallel with and above the roller and pivotally connected or hinged at its ends upon the brackets C C, as indicated in the drawings at $d$ $d$, so that it can be rocked forward or backward toward or from the roller A.

E is a lever-arm connected to box B, having a latching-bolt engaging a segment $e$, secured to the frame B, by which the seed-box can be tilted or shifted and locked, as desired. The lever may be attached directly to the box or to frame B, in the latter instance connecting with the box by a link, as shown. In the rear lower edge of box D are a series of openings $f$ $f$, provided with regulating-slides $f^2$ for regulating the flow of seed, and below each opening $f$ is secured a bell-mouthed dropping-tube F, properly attached to the box, so as to be always in position to receive the seed escaping from the openings.

G designates a shaft lying horizontally and longitudinally in box D and properly journaled in the ends thereof, and on one or both projecting ends of said shaft outside the box is a pulley H, to which motion is imparted by a belt $h$ from a pulley H', fixed on the shaft $a$ of the roller, as shown. This belt transmits motion to shaft G. On shaft G within the box and opposite each opening $f$ is a feed-disk, a coarse-toothed wheel, which forces the seed out into the openings $f$ during the rotation of the shaft, and the number of teeth on the disk and the relative speed of the shafts G and $a$ will determine the intervals between the dropping of the seed, or by varying the sizes of the pulleys on said shafts the distance between the droppings can be regulated.

Below the seed-box and in rear of the roller is a frame I, consisting of two or more horizontal transverse bars or rods $i$ $i$, lying parallel with the roller and about equal in length thereto, and two end pieces J J, which extend forward and are hinged to frame B, preferably, or on the boxings A' of shaft $a$, as indicated. This frame is connected by links $j$ with a lever K on frame B, having a latch-bolt engaging a segment or rack $k$ on frame B, as indicated, by which the frame I can be raised or lowered, as desired. Both levers E and K are in reach of the driver. L L designate a series of spring C-shaped harrow-teeth secured to rods $i$ $i$, but so as to alternate with each other and not "track." The points of these teeth are widened sufficiently to serve as furrow-openers.

M M designate coverer-blades attached to the several teeth L by means of shackles $m$ $m$ and standing in rear of said teeth, their lower ends being bifurcated to form furrow-closers or supplementary harrow-teeth. The number of teeth $n$ $n$ C and plates M on frame I correspond with the number of openings $f$ in the seed-box, and the lower end of each tube F is loosely confined between one tooth C and its plate M, as indicated, being passed through the shackles m m, so that it is prevented from slipping laterally between the plate and tooth, but has free vertical movement to permit the seed-box to be tilted or the frame I elevated without injury to the tubes.

The operation of the machine will be evident from the foregoing. The roller A first crushes the clods and smooths the surface of the ground. The teeth C then open the furrows, and the seed is dropped from tubes F directly into the furrows between teeth C and their plates M, which at once cover the seed. In turning or traveling, the seed-box is thrown forward, stopping the feed, and frame I can also be raised so as to clear the teeth and plates from the ground, the whole device being simple and effective and embodying in one machine and performing at one operation, or at least at one travel across the field, the work usually requiring three machines and three crossings of the field to accomplish.

Having described my invention, what I claim as new, and desire to secure by Letters Patent thereon, is—

1. The combination of the roller and its frame with a tilting seed-box hinged to said frame in rear of and above the roller, the devices for tilting said box, the seeding-shaft journaled in said box and driven from the roller-shaft, the frame J, connected to the roller-frame below and independently of the seed-box, carrying furrow-opening teeth, and the dropper-tubes, substantially as described.

2. The combination of the seed-box and its supporting-frame with the frame J, hinged to said supporting-frame, carrying a series of spring furrow-opening teeth, the covering-blades connected by shackles to the respective furrow-teeth, and the dropper-tubes connected to the seed-box and passing through the shackles between the teeth and blades, all substantially as and for the purpose described.

3. The combination of the series of curved teeth L, secured to a frame, with the bifurcated coverer-blades M M, respectively connected by shackles m to the teeth L in rear thereof, substantially as described.

4. The combination of the roller and its frame, the seed-box mounted upon said frame in rear of and above the roller and hinged substantially as described, with the shaft journaled in said box and carrying the feed-disks, the pulleys on the said shaft and roller-shaft, and the belt whereby the seed-shaft is driven from the roller-shaft, and the frame having a series of furrow-opening teeth L L and furrow-closing plates M M shackled to the teeth, and the seed-dropping tubes, substantially as specified.

5. The herein-described machine, consisting of a roller A, its frame B, the brackets supported on said frame, a seed-box D, hinged on said brackets in rear of the roller, and a shaft G, journaled in said box and driven by suitable connections from the roller-shaft, and the lever for tilting and locking said box, the frame I, hinged to frame B, the levers and links for raising said frame, the series of spring-teeth L L thereon, the covering-plates M M, connected to the said teeth in rear thereof, and the dropper-tubes F F, connected to the seeding-box and delivering the seed behind each tooth L and in front of its plate M, all substantially as and for the purpose described.

In testimony that I claim the foregoing as my own I affix my signature in presence of two witnesses.

JOHN RUSH.

Witnesses:
  JAMES DUSHANE,
  WILL G. FROBILL.